(12) United States Patent
Schmidt et al.

(10) Patent No.: US 8,020,927 B2
(45) Date of Patent: Sep. 20, 2011

(54) COMPOSITE REINFORCEMENT MEMBER FOR A BODY STRUCTURE OF A MOTOR VEHICLE

(75) Inventors: Tim Schmidt, Bietigheim-Bissingen (DE); Klaus Heinle, Oetisheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/634,210

(22) Filed: Dec. 9, 2009

(65) Prior Publication Data

US 2010/0181802 A1    Jul. 22, 2010

(30) Foreign Application Priority Data

Jan. 16, 2009   (DE) .......................... 10 2009 004 885

(51) Int. Cl.
  *B62D 27/02*  (2006.01)
(52) U.S. Cl. ....................... 296/203.03; 296/30; 296/209
(58) Field of Classification Search ................... 296/209, 296/210, 203.01–203.03, 29, 30
  See application file for complete search history.

(56) References Cited

U.S. PATENT DOCUMENTS

| 1,767,465 | A | | 6/1930 | Ledwinka |
| 5,125,715 | A | | 6/1992 | Kijima |
| 5,795,014 | A | * | 8/1998 | Balgaard ....................... 296/210 |
| 6,193,306 | B1 | * | 2/2001 | Lee ............................... 296/209 |
| 2005/0140158 | A1 | * | 6/2005 | Ogawa et al. .................. 296/29 |
| 2008/0178467 | A1 | | 7/2008 | Hayashi et al. |

FOREIGN PATENT DOCUMENTS

| DE | 521417 C | 3/1931 |
| DE | 10007358 A1 | 8/2001 |
| DE | 102005060146 A1 | 6/2007 |
| FR | 2793433 A1 | 11/2000 |

* cited by examiner

*Primary Examiner* — Dennis Pedder

(57) ABSTRACT

The reinforcement member of a body structure is composed of two member elements which are of u-shaped profile in cross section and which are arranged nested one inside the other. Turned-up limb portions of the outer member element have edge-side retaining lugs between which are arranged edge-side cutouts. The retaining lugs can be connected to turned-up limb portions of the inner member element, and connecting points to the bodywork outer shell are arranged in the interposed cutouts. The outer member element is composed of a high-strength steel material, with the inner member element being composed of a relatively low-strength steel material, and the terminating bodywork outer shell is formed from an aluminium material.

4 Claims, 3 Drawing Sheets

COMPOSITE REINFORCEMENT MEMBER FOR A BODY STRUCTURE OF A MOTOR VEHICLE

CROSS-REFERENCE TO RELATED APPLICATION

This application claims the priority, under 35 U.S.C. §119, of German application DE 10 2009 004 885.5, filed Jan. 16, 2009; the prior application is herewith incorporated by reference in its entirety.

BACKGROUND OF THE INVENTION

Field of the Invention

The invention relates to a composite reinforcement member for a body structure of a motor vehicle. The reinforcement member is composed of at least two profiled member elements and a terminating bodywork outer shell.

Published, non-prosecuted German patent application DE 10 2005 060 146 A1 discloses a bimetallic connecting element having cutouts in an upper layer composed of a material containing light metal and a lower layer composed of a material containing iron. The cutouts in the connecting element serve for the leadthrough of an electrode of a welding apparatus for connecting the iron-containing layer of the connecting element to a bodywork panel composed of steel. Furthermore, published, non-prosecuted German patent application DE 521 417 A, corresponding to U.S. Pat. No. 1,767,465, discloses a support with edge-side projections for connecting to a side wall of a motor vehicle and interposed cutouts for connecting to a roof of the motor vehicle.

SUMMARY OF THE INVENTION

It is accordingly an object of the invention to provide a composite reinforcement member for a body structure of a motor vehicle which overcomes the above-mentioned disadvantages of the prior art devices of this general type, which reinforcement member can be connected in a simple manner to a bodywork part, with the reinforcement member and the bodywork part being composed of different materials.

The main advantages obtained with the invention consist in that the member elements of the reinforcement member are composed of a steel material, it being possible for the member elements to be connected to one another in advance, with the reinforcement member being connected subsequently to the bodywork part which is composed of aluminium. The connection of the reinforcement member to the bodywork part takes place according to the invention in that the two member elements, which are of u-shaped profile in cross section, are arranged nested one inside the other. Turned-up limb portions of the outer member element have edge-side retaining lugs between which are arranged edge-side cutouts. The retaining lugs can be connected to turned-up limb portions of the inner member element, and connecting points to the bodywork outer shell are arranged in the interposed cutouts.

In particular, the outer member element is composed of a high-strength steel material and the inner member element is composed of a relatively low-strength steel material. The terminating bodywork outer shell is formed from an aluminium material. As a result of the different materials first of the member elements and second of the bodywork outer shell, a connection of the one member element to the bodywork part is possible according to the invention only by virtue of the outer member element being connected with the retaining lugs to the turned-up limb portions, which are situated therebelow, of the inner member element by a welded connection, and the inner member element being connected to the adjoining bodywork outer shell by a riveted connection. The riveted connection is arranged in each case in the cutouts between the retaining lugs.

It is therefore advantageously possible according to the invention for the two member elements to be connected to one another in advance by a welded connection. The member elements which are connected to one another can subsequently be connected to the bodywork part by a riveted connection.

The riveted connection preferably takes place in interposed sections of the retaining lugs which, according to the invention, are composed of a trimmed corrugation of the edges of the turned-up limb portions of the outer member element, and the interposed cutouts extend up to the limb of the outer member element, and the turned-up limb portions of the inner member element are configured so as to run straight.

As a result of the trimmed corrugation of the turned-up limb portions of the outer member element and the non-trimmed straight turned-up limb portions of the inner member element, a uniform connection first of the two member elements to one another and second of the inner member element to the bodywork part is made possible.

Other features which are considered as characteristic for the invention are set forth in the appended claims.

Although the invention is illustrated and described herein as embodied in a composite reinforcement member for a body structure of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
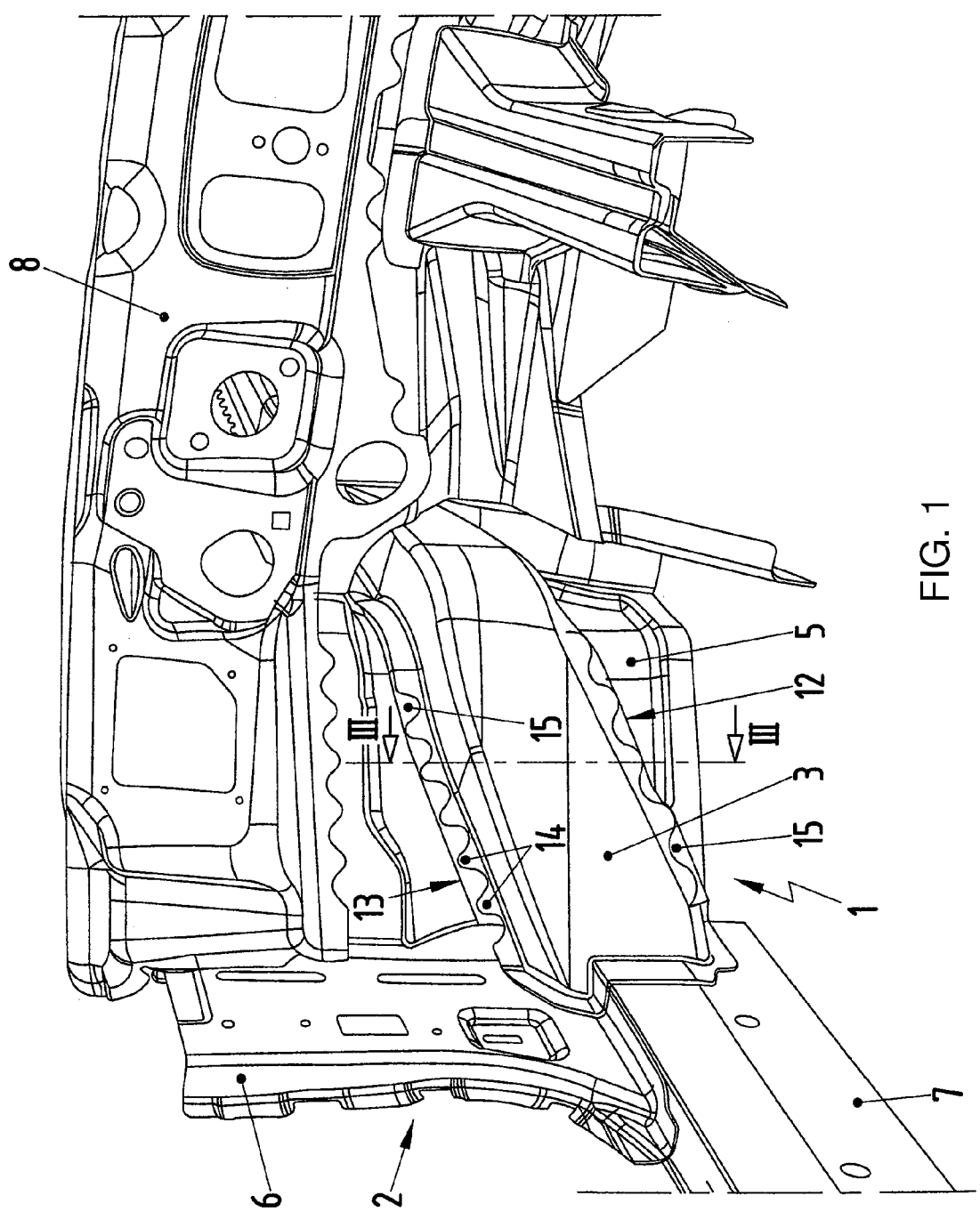
FIG. 1 is a diagrammatic, perspective view of an installed composite reinforcement member in a body structure of a front end of a motor vehicle according to the invention.
Figure 3:
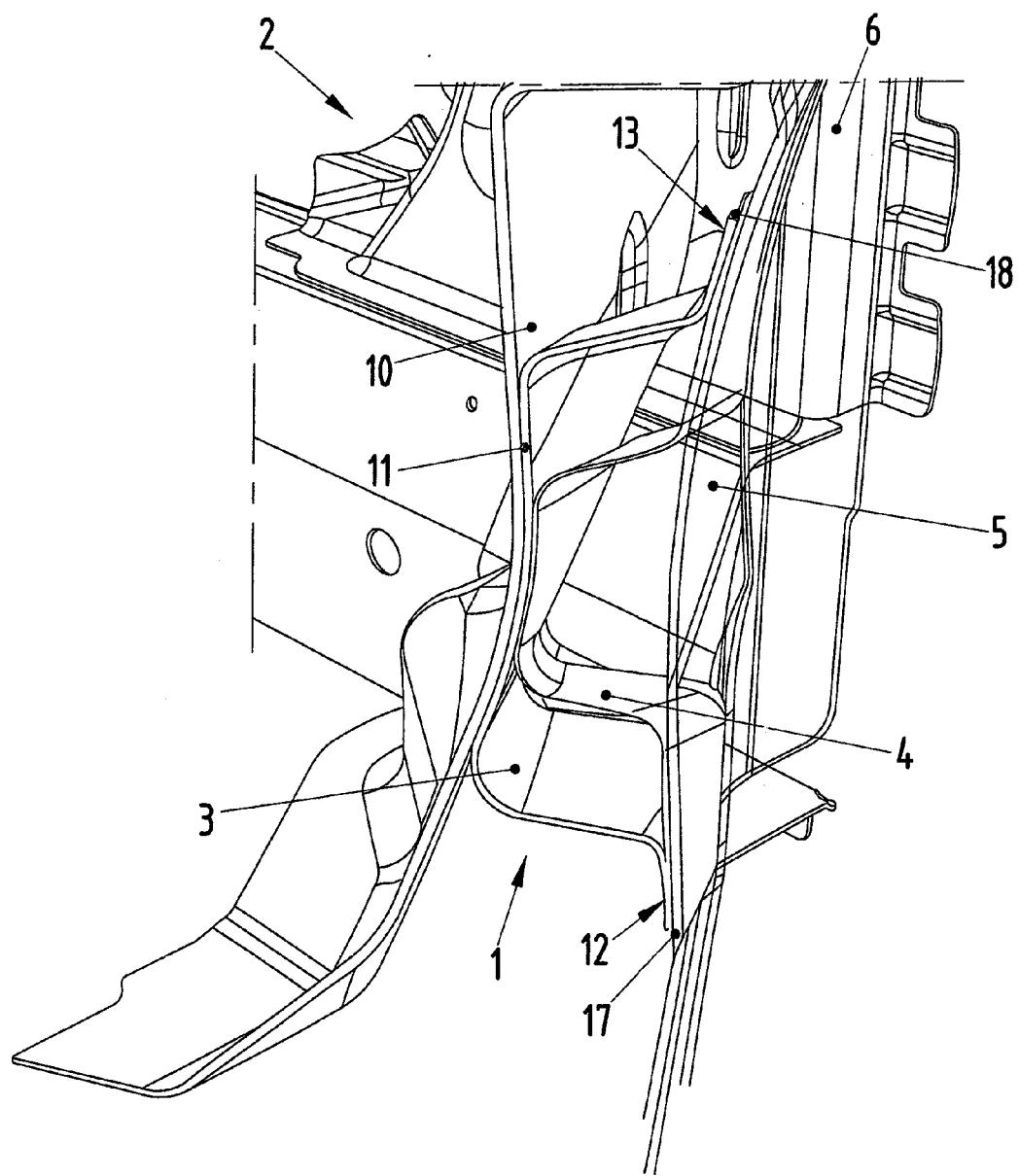
FIG. 3 is a diagrammatic, vertical sectional view through the two member elements and the body part taken along the line III-III shown in FIG. 1 without the inner bodywork wall.

Referring now to the figures of the drawing in detail and first, particularly, to FIGS. 1 and 3 thereof, there is shown a composite reinforcement member 1 for a body structure 2 of a motor vehicle and includes at least two member elements 3 and 4 and also a terminating bodywork outer shell 5. The reinforcement member 1 is connected with a rear end to a hinge pillar 6 and to a vehicle longitudinal member 7, and extends forwards into the front end through a bulkhead 8 of the vehicle.

The two member elements 3 and 4 which are of u-shaped profile in cross section are arranged nested one inside the other, with the one member element 4 being arranged within the other member element 3. An open region of the member elements 3 and 4 is closed off by the bodywork outer shell 5, wherein, opposite, a bodywork panel 10 bears against a web 11 of the outer member element 3.

Figure 2:
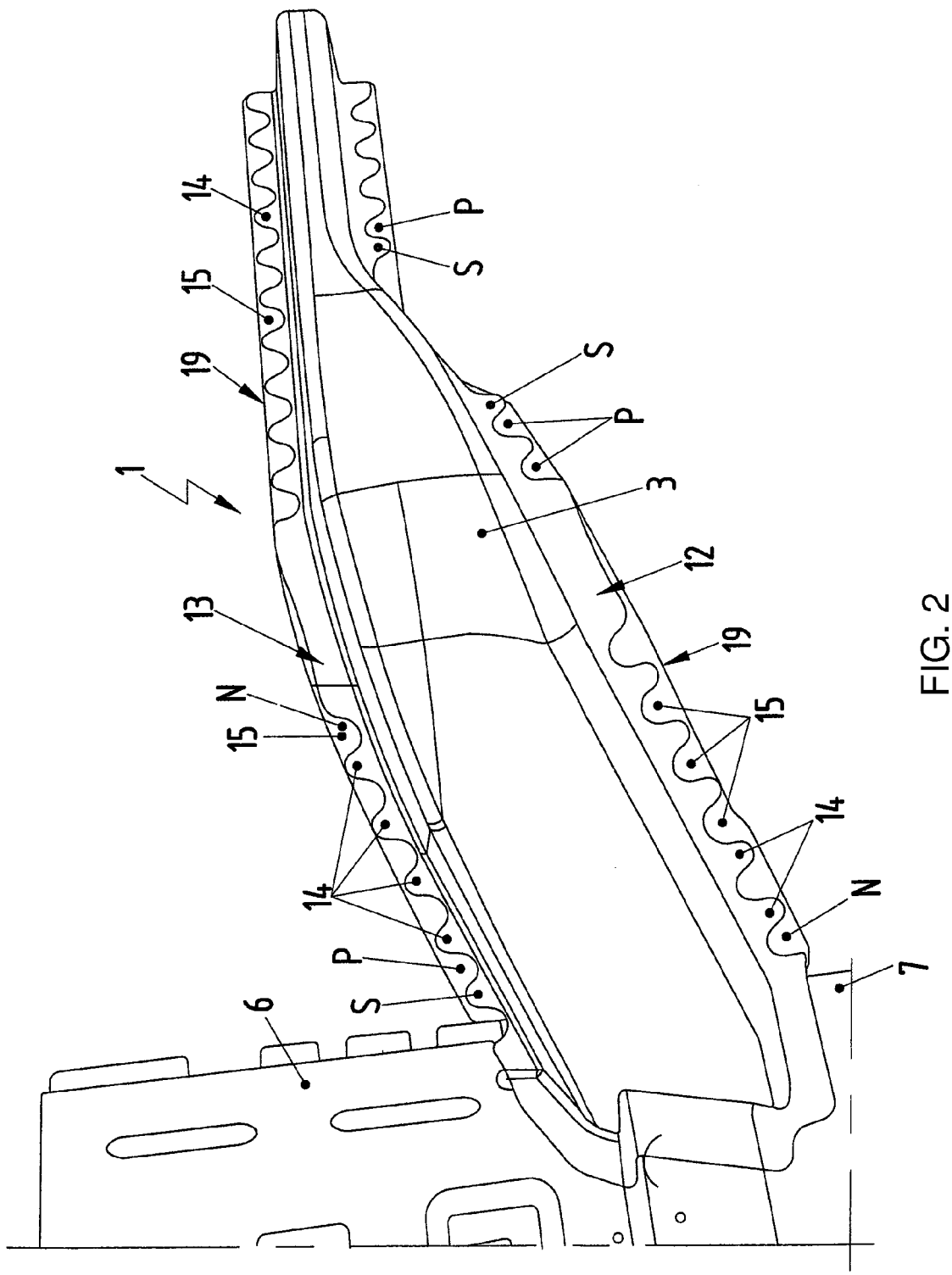
FIG. 2 is a perspective view of member elements, which are connected to one another, with a trimmed corrugation of the turned-up limb portions of the outer member element.

Edge-side retaining lugs 14 (FIG. 2) are provided on turned-up limb portions 12, 13 of the outer member element 3, between which retaining lugs 14, edge-side cutouts 15 are formed. The retaining lugs 14 are preferably formed by a trimmed corrugation of the edges of the turned-up limb portions 12, 13 of the outer member element 3. An edge 16 of the turned-up limb portions 17, 18 of the inner member element 4 does not have a trimmed corrugation and is provided with an edge 19 of straight construction.

The outer member element 3 is composed of a high-strength steel material and the inner member element 4 is formed from a relatively low-strength steel material. The terminating bodywork outer shell 5 is composed of an aluminium material.

A fixed connection of the member elements 3, 4 takes place by the retaining lugs 14 which are connected by a welded connection (connecting points S) or a spot weld to the turned-up limb portions 17, 18 of the inner member element 4. A further connection of the structural unit composed of the two member elements 3, 4 to the bodywork outer shell 5 takes place by a riveted connection (connecting points P), preferably by punch riveting, with the riveting being carried out in the interposed cutouts 15 of the turned-up limb portions 12, 13 of the outer member element 3.

The invention claimed is:

1. A composite reinforcement member for a body structure of a motor vehicle, the composite reinforcement member comprising:
    a terminating bodywork outer shell made from an aluminum material;
    at least two profiled member elements having a u-shaped profile in cross section and disposed nested one inside another, said profiled member elements including an outer member element and an inner member element, said inner member element having turned-up limb portions, said outer member element having turned-up limb portions with edge-side retaining lugs between which edge-side cutouts are formed therein, said retaining lugs of said outer member element connected by a welded connection to said turned-up limb portions of said inner member element, and connecting points to said terminating bodywork outer shell are disposed in said edge-side cutouts, and in an area of said edge-side cutouts of said outer member element, said inner member element is connected in each case via a riveted connection with said terminating bodywork outer shell made from said aluminum material;
    a hinge pillar;
    a longitudinal member; and
    said profiled member elements, which are connected to one another by means of said welded connection and are composed of a steel material, are riveted as a structural unit to said terminating bodywork outer shell composed of the aluminum material, and said structural unit connected at an end side to said hinge pillar and to said longitudinal member.

2. The composite reinforcement member according to claim 1, wherein:
    said outer member element is composed of a high-strength steel material; and
    said inner member element is composed of a relatively low-strength steel material.

3. The composite reinforcement member according to claim 1, wherein said edge-side retaining lugs are composed of a trimmed corrugation of edges of said turned-up limb portions of said outer member element, said edge-side cutouts extend up to said turned-up limb of said outer member element, and said turned-up limb portions of said inner member element are configured so as to run straight.

4. The composite reinforcement member according to claim 1, wherein:
    said turned-up limb portions of said outer member element is formed unitary and integral with said outer member element; and
    said turned-up limb portions of said inner member element is formed unitary and integral with said inner member element.

* * * * *